(12) United States Patent
Kim et al.

(10) Patent No.: US 12,406,671 B2
(45) Date of Patent: Sep. 2, 2025

(54) METHOD OF IDENTIFYING TARGET DEVICE BASED ON RECEPTION OF UTTERANCE AND ELECTRONIC DEVICE THEREFOR

(71) Applicant: Samsung Electronics Co., Ltd., Gyeonggi-do (KR)

(72) Inventors: Sunghan Kim, Gyeonggi-do (KR); Jaeyung Yeo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 317 days.

(21) Appl. No.: 17/955,647

(22) Filed: Sep. 29, 2022

(65) Prior Publication Data
US 2023/0126305 A1    Apr. 27, 2023

Related U.S. Application Data

(63) Continuation of application No. PCT/KR2022/014154, filed on Sep. 22, 2022.

(30) Foreign Application Priority Data

Oct. 27, 2021   (KR) .......................... 10-2021-0144994

(51) Int. Cl.
    *G10L 15/30*     (2013.01)
    *G06F 3/01*      (2006.01)
    *G10L 15/16*     (2006.01)

(52) U.S. Cl.
    CPC .............. *G10L 15/30* (2013.01); *G06F 3/011* (2013.01); *G10L 15/16* (2013.01)

(58) Field of Classification Search
    CPC ... G10L 15/30; G10L 15/16; G10L 2015/223; G10L 15/22; G06F 3/011; G06F 3/167;
    (Continued)

(56) References Cited

U.S. PATENT DOCUMENTS 7,469,211 B2    12/2008  Takami et al.
11,258,671 B1 *  2/2022  Vora ........................ G10L 15/30
(Continued)

FOREIGN PATENT DOCUMENTS

CN     112289313 A     1/2021
JP     2002-182688 A   6/2002
(Continued)

OTHER PUBLICATIONS

International Search Report dated Jan. 6, 2023.

*Primary Examiner* — Fariba Sirjani
(74) *Attorney, Agent, or Firm* — Cha & Reiter, LLC

(57) ABSTRACT

There is disclosed an electronic device including a communication circuitry, a processor, and a memory that stores instructions. The electronic device may be configured to acquire, from a plurality of external electronic devices that have received a wake-up utterance, state information indicating states of the plurality of external electronic devices, acquire control data corresponding to a control utterance subsequent to the wake-up utterance and instructing control of a first function, determine availability of the first function for at least one of the plurality of external electronic devices by using the state information, determine a target device to perform the first function from the plurality of external electronic devices, based on the availability, and control the target device so as to perform the first function.

14 Claims, 12 Drawing Sheets

(58) Field of Classification Search
CPC ......... G06F 2203/0381; H04L 41/0893; H04L 41/16; H04L 41/22; H04L 43/0805; H04L 67/12; H04W 48/04
See application file for complete search history.

(56) References Cited

U.S. PATENT DOCUMENTS

| | | | |
|---|---|---|---|
| 11,289,086 B2* | 3/2022 | Burton | G10L 15/08 |
| 11,508,375 B2 | 11/2022 | Choi et al. | |
| 2004/0030560 A1* | 2/2004 | Takami | G10L 15/06 |
| | | | 704/E15.044 |
| 2016/0155443 A1* | 6/2016 | Khan | G06F 3/167 |
| | | | 704/275 |
| 2019/0115025 A1 | 4/2019 | Choi | |
| 2020/0193994 A1 | 6/2020 | Ahn et al. | |
| 2021/0005205 A1 | 1/2021 | Choi et al. | |
| 2021/0174796 A1 | 6/2021 | Chae et al. | |
| 2021/0343283 A1 | 11/2021 | Choi | |
| 2022/0301566 A1* | 9/2022 | Van Os | G10L 15/26 |
| 2023/0126305 A1* | 4/2023 | Kim | G10L 15/22 |
| | | | 704/275 |

FOREIGN PATENT DOCUMENTS

| | | |
|---|---|---|
| JP | 2021-99378 A | 7/2021 |
| KR | 10-2015-0103586 A | 9/2015 |
| KR | 10-2017-0135133 A | 12/2017 |
| KR | 10-2020-0048701 A | 5/2020 |
| KR | 10-2020-0127814 A | 11/2020 |
| KR | 10-2021-0004803 A | 1/2021 |
| KR | 10-2021-0069977 A | 6/2021 |

* cited by examiner

METHOD OF IDENTIFYING TARGET DEVICE BASED ON RECEPTION OF UTTERANCE AND ELECTRONIC DEVICE THEREFOR

CROSS-REFERENCE TO RELATED APPLICATION(S)

This application is a continuation of International Application No. PCT/KR2022/014154, which was filed on Sep. 22, 2022, and claims priority to Korean Patent Application No. 10-2021-0144994, filed on Oct. 27, 2021, in the Korean Intellectual Property Office, the disclosure of which are incorporated by reference herein their entirety.

BACKGROUND

Technical Field

One or more embodiments of the present disclosure generally relate to a method of identifying a target device based on reception of an utterance and an electronic device therefor.

Description of Related Art

Techniques for controlling an electronic device based on voice commands of a user are being widely used. For example, the electronic device may include a voice assistant application or program configured to identify the user's intent from the user's utterance and perform an action corresponding to the identified intent. The user may control the electronic device through these voice commands. With the increasing number of electronic devices supporting the voice assistance, the user may control various devices based on speech. For example, the user may activate the voice assistant by uttering a wake-up word. After activation of the voice assistant, the user may control a specific function of the electronic device by using a control utterance instructing control of the specific function.

SUMMARY

With the increasing number of electronic devices supporting voice assistance, a plurality of electronic devices adjacent to the user may all be configured to support voice assistance. In this case, a plurality of electronic devices may respond to a specified utterance of the user (e.g., wake-up word), including the device intended by the user and other devices not intended by the user. When a plurality of electronic devices respond to the utterance of the user, the user may have difficulty controlling the intended electronic device via voice command.

In order to prevent the plurality of electronic devices from simultaneously responding, only one winner device in the plurality of electronic devices receiving the wake-up utterance may be designated to provide a response to the user. However, experience of the user may vary depending on which device is determined as the winner device. For example, the intent of the user may be to increase the volume of the TV. If the TV is selected as the winner device, the user may increase the volume of the TV by simply uttering "volume up". On the other hand, if a device other than the TV is selected as the winner device, the user may have to indicate a target device by uttering "turn up the TV volume". As described above, the utterance of the user may have to be changed depending on the determination of the winner device, which may inconvenience the user.

In another example, the user may be forced to always include the name of the device in control utterances. However, in this case, because the user has to include the name of the target device in the control utterances, the user is also inconvenienced. Furthermore, as the number of devices to be controlled increases, identification of a target device may become more difficult.

Certain embodiments of the present disclosure may provide an electronic device and a method for solving the above-described problems.

According to an aspect of the present disclosure, there is provided an electronic device including a communication circuitry, a processor, and a memory that stores instructions, and the instructions, when executed by the processor, cause the electronic device to acquire, from a plurality of external electronic devices that have received a wake-up utterance, state information indicating states of the plurality of external electronic devices, acquire control data corresponding to a control utterance subsequent to the wake-up utterance, the control utterance instructing control of a first function, determine availability of the first function for at least one of the plurality of external electronic devices by using the state information, determine a target device to perform the first function from the plurality of external electronic devices, based on the availability, and control the target device so as to perform the first function.

According to another aspect of the present disclosure, there is provided a method for controlling a target device of an electronic device, the method including acquiring, from a plurality of external electronic devices that have received a wake-up utterance, state information indicating states of the plurality of external electronic devices, acquiring control data corresponding to a control utterance subsequent to the wake-up utterance, the control utterance instructing control of a first function, determining availability of the first function for at least one of the plurality of external electronic devices by using the state information, determining a target device to perform the first function from the plurality of external electronic devices, based on the availability, and controlling the target device so as to perform the first function.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The system according to an embodiment of the present disclosure may control an electronic device according to the intent of the utterance of a user, thereby improving user convenience and utility of the electronic device.

An electronic device according to an example of the present disclosure may identify a target device in consideration of the intent of the user and states of various electronic devices, thereby improving user convenience, which may drive the user to use the electronic devices more frequently.

The electronic device according to an example of the present disclosure may use utterance data and the state of an electronic device together, thereby reducing input steps of the user.

Hereinafter, various embodiments disclosed in the present disclosure will be described with reference to the accompanying drawings. However, this is not intended to limit the present disclosure to the specific embodiments, and it is to be construed to include various modifications, equivalents, and/or alternatives of embodiments of the present disclosure.

Figure 1:
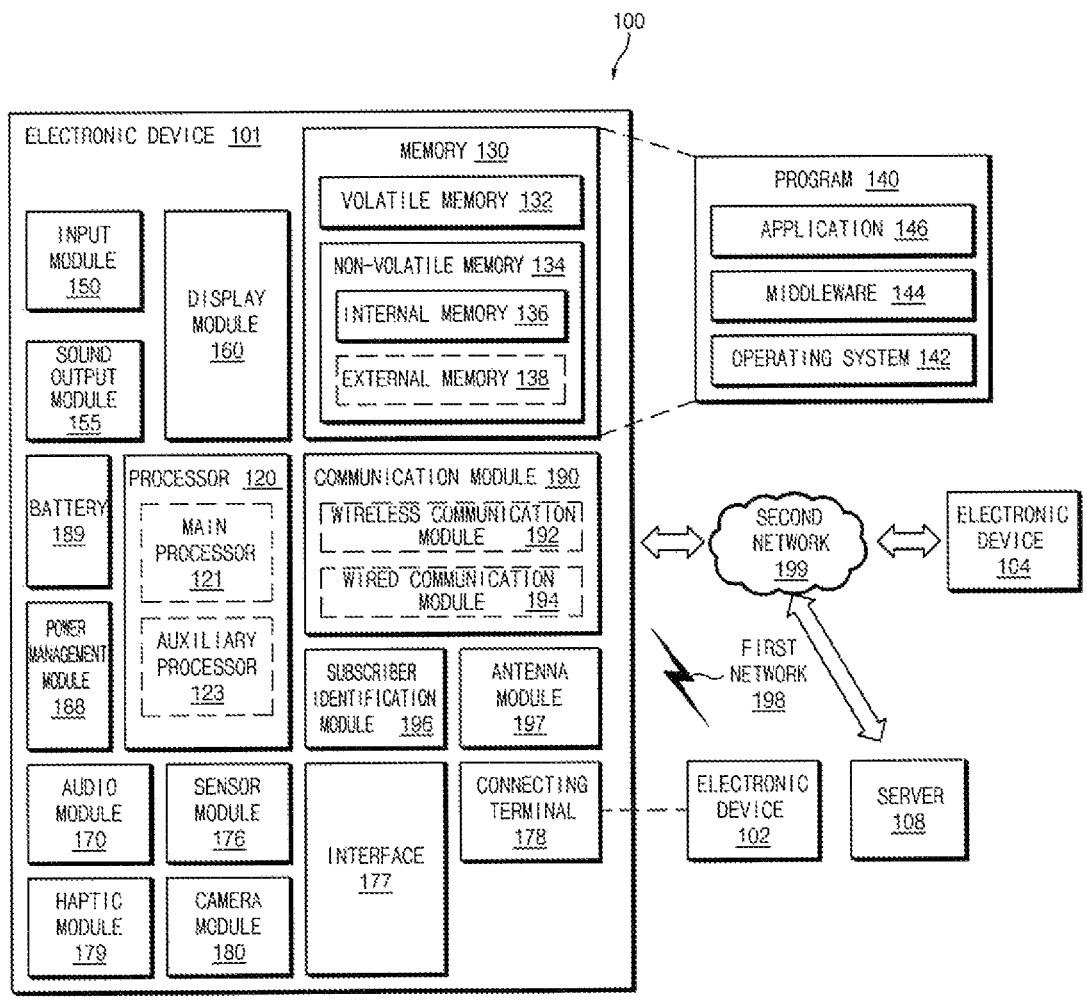
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
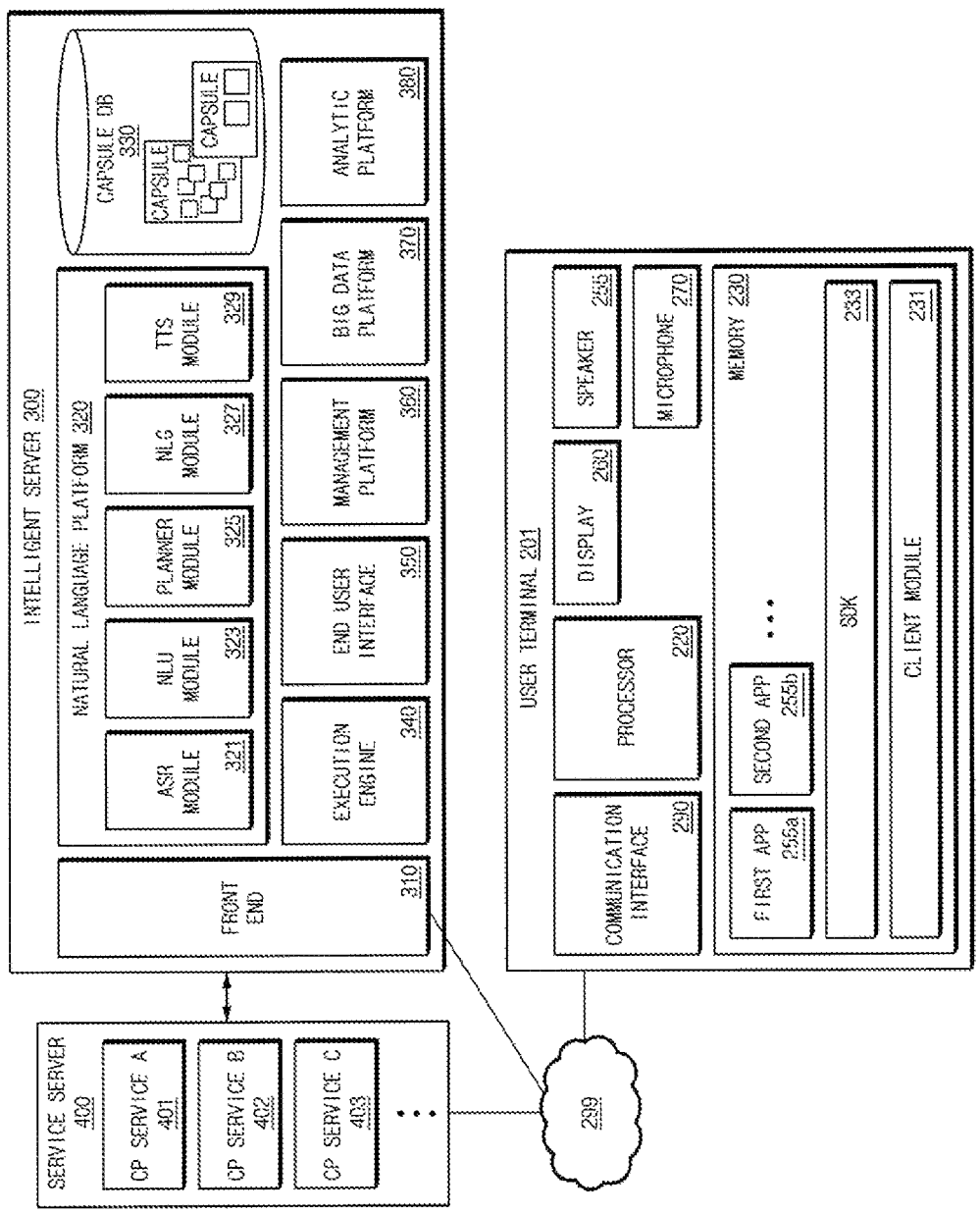
FIG. 2 is a block diagram illustrating an integrated intelligence system according to an embodiment.

FIG. 2 is a block diagram illustrating an integrated intelligence system according to an embodiment.

Referring to FIG. 2, the integrated intelligent system according to an embodiment may include a user terminal 201, an intelligent server 300, and a service server 400.

The user terminal 201 (e.g., the electronic device 101 of FIG. 1) according to an embodiment may be a terminal device (or electronic device) connectable to the Internet, for example, a mobile phone, a smartphone, a personal digital assistant (PDA), a laptop computer, a television (TV), a white home appliance, a wearable device, a head mounted device (HMD), or a smart speaker.

According to the illustrated embodiment, the user terminal 201 may include a communication interface 290, a microphone 270, a speaker 255, a display 260, a memory 230, and/or a processor 220. The components listed above may be operatively or electrically connected to each other.

The communication interface 290 (e.g., the communication module 190 of FIG. 1) may be configured to be connected to an external device to transmit/receive data. The microphone 270 (e.g., the audio module 170 of FIG. 1) may receive sound (e.g., an utterance of the user) and convert the sound into an electrical signal. The speaker 255 (e.g., the sound output module 155 of FIG. 1) may output the electrical signal as sound (e.g., voice). The display 260 (e.g., the display module 160 of FIG. 1) may be configured to display images or videos. The display 260 according to an embodiment may also display a graphic user interface (GUI) of an executed app (or an application program).

The memory 230 (e.g., the memory 130 of FIG. 1) according to an embodiment may store a client module 231, a software development kit (SDK) 233, and a plurality of applications. The client module 231 and the SDK 233 may constitute a framework (or solution program) for performing various functions. In addition, the client module 231 or the SDK 233 may constitute a framework for processing voice input.

The plurality of applications (e.g., 235a and 235b) may be programs for performing specified functions. According to an embodiment, the plurality of applications may include a first app 235a and/or a second app 235b. According to an embodiment, each of the plurality of applications may include instructions for a plurality of operations that together performing a specified function. For example, the applications may include an alarm app, a message app, and/or a schedule app. According to an embodiment, the plurality of applications may be executed by the processor 220 to sequentially execute at least some of the plurality of operations.

The processor 220 according to an embodiment may control the overall operations of the user terminal 201. For example, the processor 220 may be electrically connected to the communication interface 290, the microphone 270, the speaker 255, and the display 260 to perform a specified operation. For example, the processor 220 may include at least one processor. The processor 220 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "microprocessor" may be hardware in the claimed disclosure.

The processor 220 according to an embodiment may also execute a program stored in the memory 230 to perform a specified function. For example, the processor 220 may execute at least one of the client module 231 and the SDK 233 to perform the following operations for processing voice input. The processor 220 may control operations of a plurality of applications through, for example, the SDK 233. The following operations described as operations of the client module 231 or SDK 233 may be operations performed by execution of the processor 220.

The client module 231 according to an embodiment may receive a voice input. For example, the client module 231 may receive a voice signal corresponding to an utterance of the user detected through the microphone 270. The client module 231 may transmit the received voice input (e.g., voice signal) to the intelligent server 300. The client module 231 may transmit, to the intelligent server 300, state information about the user terminal 201 together with the received voice input. The state information may be, for example, execution state information for an app.

The client module 231 according to an embodiment may receive a result corresponding to the received voice input from the intelligent server 300. For example, if the intelligent server 300 calculates a result corresponding to the received voice input, the client module 231 may receive the result corresponding to the received voice input. The client module 231 may display the received result on the display 260.

The client module 231 according to an embodiment may receive a plan corresponding to the received voice input. The client module 231 may display, on the display 260, execution results of a plurality of actions of the app executed according to the plan. The client module 231 may, for example, sequentially display, on the display 260, the execution results of the plurality of actions. In another example, the user terminal 201 may display only some execution results of the plurality of actions (e.g., the result of the last action) on the display 260.

According to an embodiment, the client module 231 may receive a request for obtaining information necessary for calculating the result corresponding to the voice input from the intelligent server 300. According to an embodiment, the client module 231 may transmit the necessary information to the intelligent server 300 in response to the request.

The client module 231 according to an embodiment may transmit, to the intelligent server 300, result information obtained by executing the plurality of actions according to the plan. The intelligent server 300 may confirm that the voice input received by using the result information has been correctly processed.

The client module 231 according to an embodiment may include a speech recognition module. According to an embodiment, the client module 231 may recognize a voice input to perform a limited function by using the speech recognition module. For example, the client module 231 may execute an intelligent app for processing a specified voice input (e.g., wake up!) by performing sequential operations in response to the voice input.

The intelligent server 300 according to an embodiment may receive information related to the voice input of the user from the user terminal 201 through a network 299 (e.g., the first network 198 and/or the second network 199 of FIG. 1). According to an embodiment, the intelligent server 300 may convert data related to the received voice input into text data (e.g. by performing speech-to-text recognition). According to an embodiment, the intelligent server 300 may generate at least one plan for performing the task corresponding to the voice input of the user based on the text data.

According to one embodiment, the plan may be generated by an artificial intelligent (AI) system. The artificial intelligence system may be a rule-based system, and may be a neural network-based system (e.g., feedforward neural network (FNN), and/or recurrent neural network (RNN)). Alternatively, the artificial intelligence system may be a combination of those described above, or another artificial intelligence system other than those described above. According to an embodiment, the plan may be selected from a set of predefined plans or may be generated in real time in response to the user request corresponding to the voice input. For example, the artificial intelligence system may select at least one plan from among a plurality of predefined plans.

The intelligent server 300 according to an embodiment may transmit the result according to the generated plan to the user terminal 201 or transmit the generated plan to the user terminal 201. According to an embodiment, the user terminal 201 may display the result according to the plan on the display 260. According to an embodiment, the user terminal 201 may display, on the display 260, the result obtained by executing actions according to the plan.

The intelligent server 300 according to an embodiment may include a front end 310, a natural language platform 320, a capsule database 330, an execution engine 340, an end user interface 350, a management platform 360, a big data platform 370, or an analytic platform 380.

The front end 310 according to an embodiment may receive the voice input received by the user terminal 201 from the user terminal 201. The front end 310 may transmit a response corresponding to the voice input to the user terminal 201.

According to an embodiment, the natural language platform 320 may include an automatic speech recognition module (ASR module) 321, a natural language understanding module (NLU module) 323, a planner module 325, a natural language generator module (NLG module) 327, and/or a text-to-speech module (TTS module) 329.

The automatic speech recognition module 321 according to an embodiment may convert the voice input received from the user terminal 201 into text data. The natural language understanding module 323 according to an embodiment may determine an intent of the user by using text data of the voice input. For example, the natural language understanding module 323 may determine the intent of the user by performing syntactic analysis and/or semantic analysis. The natural language understanding module 323 according to an embodiment may identify the meaning of words by using linguistic features (e.g., grammatical elements) of morphemes or phases, and determine the intent of the user by matching the meaning of the identified word with the intent.

The planner module 325 according to an embodiment may generate a plan by using the intent and parameters determined by the natural language understanding module 323. According to an embodiment, the planner module 325 may determine a plurality of domains required to perform a task required by the voice input based on the determined intent. The planner module 325 may determine a plurality of actions in each of the plurality of domains determined based on the intent. According to an embodiment, the planner module 325 may determine parameters required to execute the determined plurality of actions or the result value(s) outputted by the execution of the plurality of actions. The parameter and the result value(s) may be defined in a specified format (or class). Accordingly, the plan may include a plurality of actions and/or a plurality of concepts determined by the intent of the user. The planner module 325 may determine the relationship between the plurality of actions and the plurality of concepts in stages (or hierarchically). For example, the planner module 325 may determine the execution order of the plurality of actions determined based on the intent of the user based on the plurality of concepts. In other words, the planner module 325 may determine the execution order of the plurality of actions based on parameters required for execution of the plurality of actions and results output by the execution of the plurality of actions. Accordingly, the planner module 325 may generate a plan including information (e.g., ontology) on the relation between the plurality of actions and the plurality of concepts. The planner module 325 may generate the plan by using information stored in the capsule database 330 in which sets of relationships between concepts and actions are stored.

The natural language generator module 327 according to an embodiment may change specified information into text format. The information changed to the text format may be in the form of natural language utterance. The text-to-speech module 329 according to an embodiment may change information in the text format into information in voice format.

According to an embodiment, some or all of the functions of the natural language platform 320 may be implemented in the user terminal 201 as well. For example, the user terminal 201 may include an automatic speech recognition module and/or a natural language understanding module. After the user terminal 201 recognizes the voice command of the user, text information corresponding to the recognized voice command may be transmitted to the intelligent server 300. For example, the user terminal 201 may include a text-to-speech module. The user terminal 201 may receive text information from the intelligent server 300 and output the received text information as voice.

The capsule database 330 may store information on relationships between a plurality of concepts and actions corresponding to a plurality of domains. A capsule according to an embodiment may include a plurality of action objects (or action information) and/or concept objects (or concept information) included in the plan. According to an embodiment, the capsule database 330 may store a plurality of capsules in the form of a concept action network (CAN). According to an embodiment, the plurality of capsules may be stored in a function registry included in the capsule database 330.

The capsule database 330 may include a strategy registry in which strategy information necessary for determining a plan corresponding to a voice input is stored. The strategy information may include reference information for determining one plan when there are a plurality of plans corresponding to the voice input. According to an embodiment, the capsule database 330 may include a follow up registry in which information on a subsequent action in a specified situation is stored. This is for the purpose of suggesting the subsequent action to the user. The subsequent action may include, for example, a subsequent utterance. According to an embodiment, the capsule database 330 may include a layout registry that stores layout information regarding information output through the user terminal 201. According to an embodiment, the capsule database 330 may include a vocabulary registry in which vocabulary information included in the capsule information is stored. According to an embodiment, the capsule database 330 may include a dialog registry in which information regarding dialog (or interaction) with the user is stored. The capsule database 330 may update a stored object through a developer tool. The developer tool may include, for example, a function editor for updating an action object or a concept object. The developer tool may include a vocabulary editor for updating the vocabulary. The developer tool may include a strategy editor for generating and registering strategies for determining plans. The developer tool may include a dialog editor for generating dialog with the user. The developer tool may include a follow up editor that may edit follow-up utterances that activate subsequent goals and provide hints. The subsequent goal may be determined based on various parameters, such as a currently set goal, a user's preference, or an environmental condition. In an embodiment, the capsule database 330 may be implemented in the user terminal 201 as well.

The execution engine 340 according to an embodiment may calculate a result by using the generated plan. The end user interface 350 may transmit the calculated result to the user terminal 201. Accordingly, the user terminal 201 may receive the result and provide the received result to the user. The management platform 360 according to an embodiment may manage information used in the intelligent server 300. The big data platform 370 according to an embodiment may collect user data. The analytic platform 380 according to an embodiment may manage the quality of service (QoS) of the intelligent server 300. For example, the analytic platform 380 may manage the components and processing speed (or efficiency) of the intelligent server 300.

The service server 400 according to an embodiment may provide a specified service (e.g., food order or hotel reservation) to the user terminal 201. According to an embodiment, the service server 400 may be a server operated by a third party. The service server 400 according to an embodiment may provide, to the intelligent server 300, information for generating a plan corresponding to the received voice input. The provided information may be stored in the capsule database 330. In addition, the service server 400 may provide result information according to the plan to the intelligent server 300. The service server 400 may communicate with the intelligent server 300 and/or the user terminal 201 through the network 299. The service server 400 may communicate with the intelligent server 300 through a separate connection. Although the service server 400 is illustrated as one server in FIG. 2, embodiments of the present disclosure are not limited thereto. At least one of the respective services 401, 402, and 403 of the service server 400 may be implemented as a separate server.

In the integrated intelligent system described above, the user terminal 201 may provide various intelligent services to the user in response to a user input. The user input may include, for example, an input via a physical button, a touch input, or a voice input.

In an embodiment, the user terminal 201 may provide a speech recognition service through an intelligent app (or a speech recognition app) stored therein. In this case, for example, the user terminal 201 may recognize user utterance or voice input received through the microphone 270, and provide a service corresponding to the recognized voice input to the user.

In an embodiment, the user terminal 201 may perform a specified operation alone or together with the intelligent server 300 and/or the service server 400, based on the received voice input. For example, the user terminal 201 may execute an app corresponding to the received voice input and perform a specified operation through the executed app.

In an embodiment, when the user terminal 201 provides a service together with the intelligent server 300 and/or the service server 400, the user terminal 201 may detect the user utterance by using the microphone 270 and generate a signal (or voice data) corresponding to the detected user utterance. The user terminal 201 may transmit the voice data to the intelligent server 300 by using the communication interface 290.

In response to the voice input received from the user terminal 201, the intelligent server 300 according to an embodiment may generate a plan for performing a task corresponding to the voice input, or the result of performing one or more actions according to the plan. The plan may include, for example, a plurality of actions for performing the task corresponding to the voice input of the user and/or a plurality of concepts related to the plurality of actions. The concepts may define parameters input to the execution of the plurality of actions or result values output by the execution of the plurality of actions. The plan may include relation information between a plurality of actions and/or a plurality of concepts.

The user terminal 201 according to an embodiment may receive the response by using the communication interface 290. The user terminal 201 may output a voice signal generated in the user terminal 201 by using the speaker 255 so that the result is outputted as audio, or output an image generated in the user terminal 201 by using the display 260.

Figure 3:
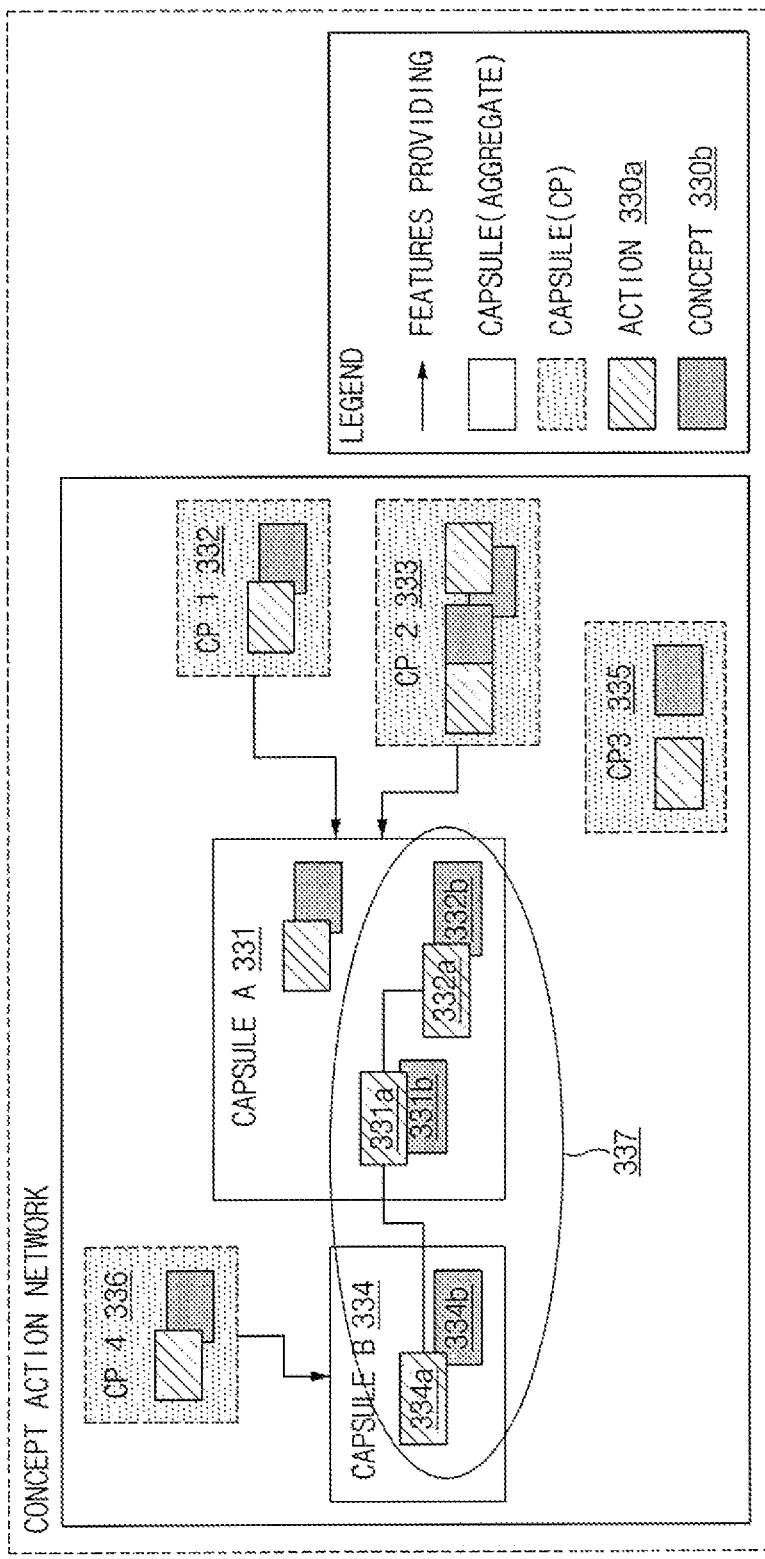
FIG. 3 is a diagram illustrating a form in which information on relation between concepts and actions is stored in a database, according to an embodiment.

FIG. 3 is a diagram illustrating concepts and actions stored in a database, according to an embodiment.

A capsule database (e.g., the capsule database 330) of the intelligent server 300 may store capsules in the form of a concept action network (CAN). The capsule database may store an action for processing a task corresponding to a voice input of the user and a parameter necessary for the action in the form of the concept action network (CAN).

The capsule database may store a plurality of capsules (capsule A 331 and capsule B 334) corresponding to a plurality of domains (e.g., applications), respectively. According to an embodiment, one capsule (e.g., the capsule A 331) may correspond to one domain (e.g., location, application). In addition, one capsule may correspond to a capsule of at least one service provider for performing a function for a domain related to the capsule (e.g., CP 1 332, CP 2 333, CP3 335, and/or CP4 336). According to an embodiment, one capsule may include at least one action 330a and at least one concept 330b for performing a specified function.

The natural language platform 320 may generate a plan for performing a task corresponding to the voice input received by using the capsules stored in the capsule database 330. For example, the planner module 325 of the natural language platform may generate a plan by using capsules stored in the capsule database. For example, a plan 337 may be generated by using actions 331a and 332a and concepts 331b and 332b of the capsule A 331 and an action 334a and a concept 334b of the capsule B 334.

Figure 4:
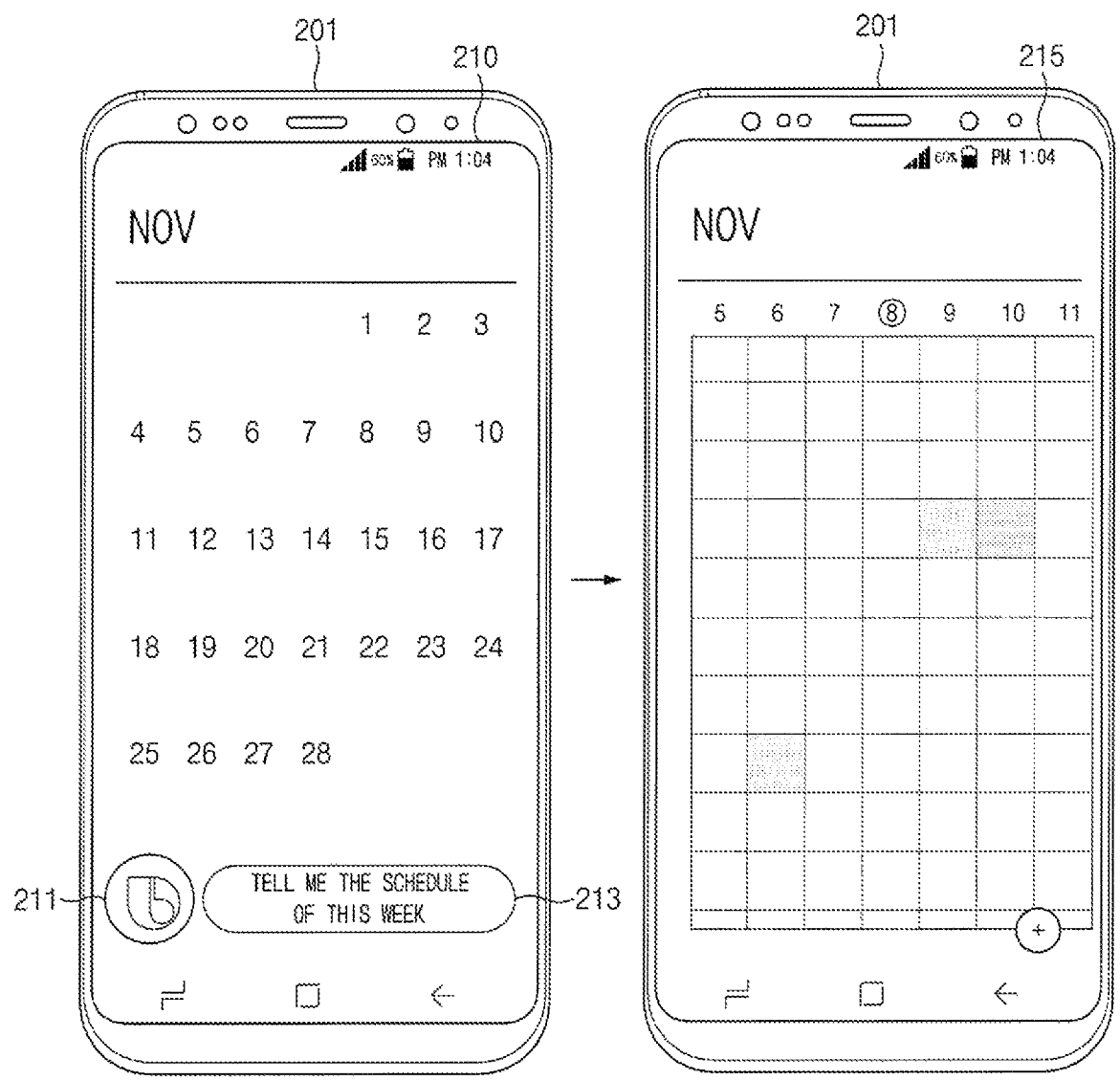
FIG. 4 is a diagram illustrating a user terminal displaying a screen for processing a voice input received through an intelligent app, according to an embodiment.

FIG. 4 is a diagram illustrating a screen in which the user terminal processes a voice input received through the intelligent app, according to an embodiment.

The user terminal 201 may execute an intelligent app to process the user input through the intelligent server 300.

According to an embodiment, if a specified voice input (e.g., wake up!) is recognized or an input is received via a hardware key (e.g., dedicated hardware key) or a software key, the user terminal 201 may execute the intelligent app to process the voice input on a first screen 210. The user terminal 201 may, for example, execute the intelligent app when the schedule app is being executed. According to an embodiment, the user terminal 201 may display an object (e.g., icon) 211 corresponding to the intelligent app on the display 260. According to an embodiment, the user terminal 201 may receive a voice input of a user utterance. For example, the user terminal 201 may receive a voice input saying "Tell me the schedule of the week!" According to an embodiment, the user terminal 201 may display a user interface (UI) 213 (e.g., input window) of the intelligent app in which text data of the received voice input is displayed on the display.

According to an embodiment, on the second screen 215, the user terminal 201 may display the result corresponding to the received voice input on the display. For example, the user terminal 201 may receive a plan corresponding to the received user input, and display "schedule of this week" on the display according to the plan.

Figure 5:
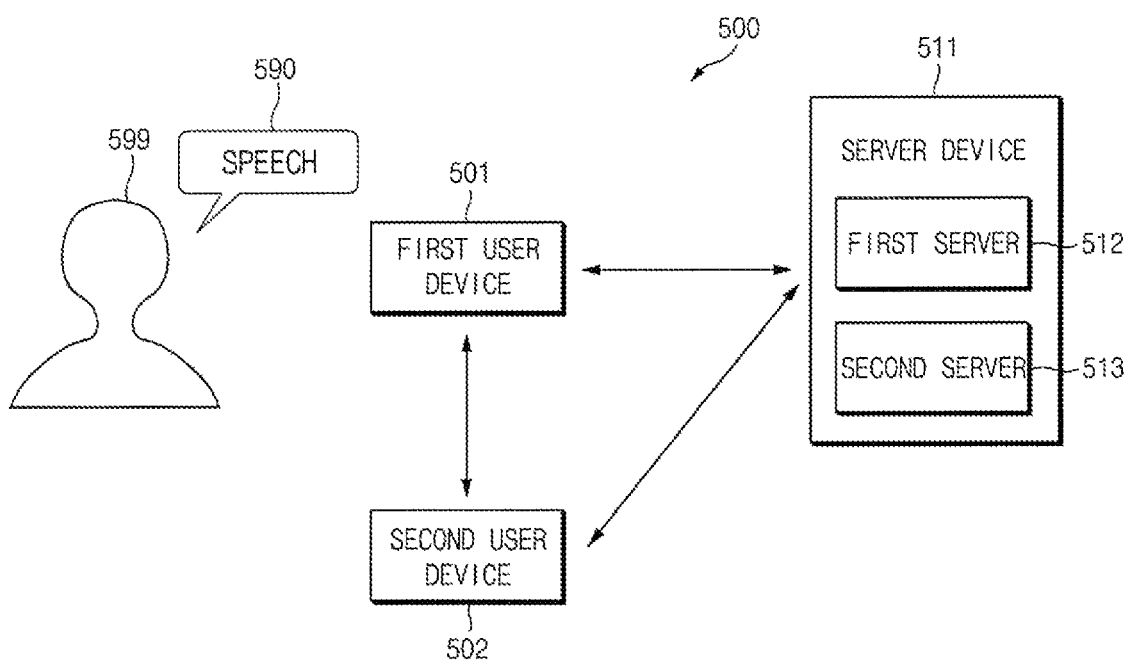
FIG. 5 illustrates a system for controlling a target device based on an utterance, according to an example.

FIG. 5 illustrates a system for controlling a target device based on an utterance, according to an example.

Referring to FIG. 5, a system 500 may include a first user device 501, a second user device 502, and a server device 511. Each of the first user device 501 and the second user device 502 may be referred to as a listener device that receives utterance 590 of a user 599, and may include components similar to those of the user terminal 201 of FIG. 2 or the electronic device 101 of FIG. 1. Each of the first user device 501 and the second user device 502 may include a voice assistant application (e.g., the client module 231 of FIG. 2). Each of the first user device 501 and the second user device 502 may be configured to receive the utterance 590 of the user 599 using voice receiving circuitry (e.g., the audio module 170 of FIG. 1), and transmit utterance data corresponding to the utterance 590 to the server device 511. For example, each of the first user device 501 and the second user device 502 may be configured to transmit utterance data to the server device 511 through a network such as the Internet.

The target device may be referred to as a device to be controlled by the utterance 590. According to an embodiment, the target device may be one of the first user device 501 and the second user device 502 that have received the utterance 590. In examples of the present disclosure, by determining one of the devices that have received (e.g., successfully received) the utterance 590 as the target device, the target device may be determined to be matched with the intent of the user 599. In an example, the target device may be configured to receive control data from the server device 511 through a network such as the Internet and perform one or more operations (e.g., sequential operations) according to the control data.

The server device 511 may include at least one server device. For example, the server device 511 may include a first server 512 and a second server 513. The server device 511 may be configured to receive utterance data from each of the first user device 501 and the second user device 502, and process the utterance data. For example, the first server 512 may correspond to the intelligent server 300 of FIG. 2. The second server 513 may include a database of an external electronic device. The "external electronic device" may refer to an electronic device located outside the server device 511. For example, information on the first user device 501 and/or the second user device 502 may be stored in the database of the second server 513. The second server 513 may be referred to as an Internet-of-things (IoT) server. For example, the second server 513 may store information about the external electronic device (e.g., an identifier of the external electronic device, group information, or the like), and may include components for controlling the external electronic device. The first server 512 may determine the intent of the user 599 included in the received utterance data by processing the received utterance data. When the intent of the user 599 is to control an external device (e.g., the target device), the first server 512 may use data of the second server 513 to identify the target device to be controlled, and may control the target device so that the identified target device performs an operation according to the intent. Although the first server 512 and the second server 513 are illustrated as separate components in FIG. 5, the first server 512 and the second server 513 may be implemented as one server.

The configuration of the system 500 illustrated in FIG. 5 is only an example, and embodiments of the present disclosure are not limited thereto. Various methods for controlling the target device may be included in the embodiments of the present disclosure.

In an example, the utterance data transmitted by each of the first user device 501 and the second user device 502 to the server device 511 may be in any type of file format suitable for voice recording. In this case, the server device 511 may determine the intent of the user 599 for the utterance data by deploying speech recognition and natural language analysis of the utterance data. In an example, the utterance data transmitted by each of the first user device 501 and the second user device 502 to the server device 511 may include the recognition result of speech corresponding to the utterance 590. In this case, each of the first user device 501 and the second user device 502 may perform automatic speech recognition on the utterance 590 and transmit the result of the automatic speech recognition to the server device 511 as the utterance data. In this case, the server device 511 may determine the intent of the user 599 for the utterance data by deploying just the natural language analysis of the utterance data.

In an example, each of the first user device 501 and the second user device 502 may be configured to perform automatic speech recognition and natural language understanding. Each of the first user device 501 and the second user device 502 may be configured to directly identify the intent of the user 599 from the utterance 590. In this case, each of the first user device 501 and the second user device 502 may use information stored in the second server 513 or information shared between the first user device 501 and the second user device 502 to identify the target device, and may control the target device according to the intent of the user 599.

In an example, the system 500 may not include the server device 511. For example, each of the first user device 501 and the second user device 502 may be configured to perform all of the operations of the server device 511 described above.

The examples described above with reference to FIG. 5 are various examples of the system capable of controlling the target device based on the utterance, and embodiments of the present disclosure are not limited thereto. It should be understood to those skilled in the art that the control methods of the present disclosure described below may be carried out using the examples described above with reference to FIG. 5, as well as other embodiments.

Figure 6:
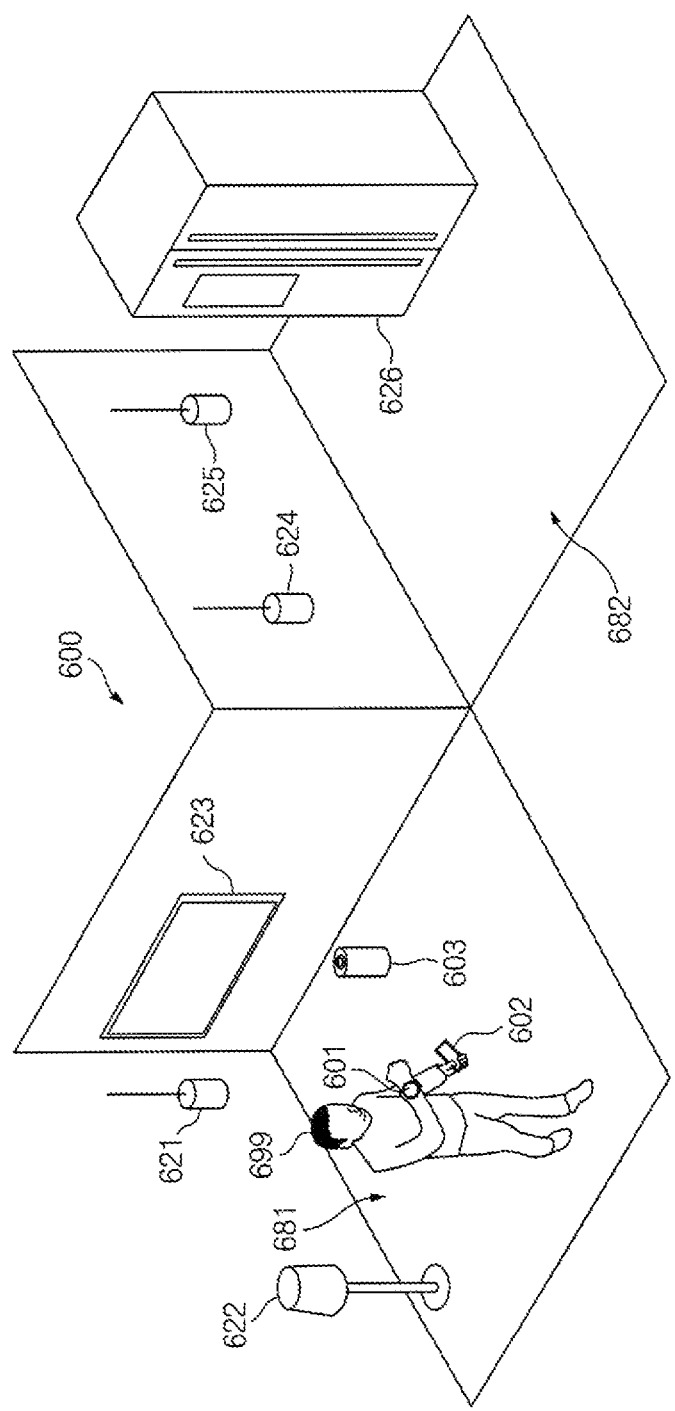
FIG. 6 illustrates a multi-device environment according to an example.

FIG. 6 illustrates a multi-device environment according to an example.

Referring to FIG. 6, a multi-device environment 600 according to an embodiment may include at least one listener device and at least one target device (e.g., the device to be controlled).

For example, a smart watch 601, a mobile phone 602, and an artificial intelligence (AI) speaker 603 may correspond to the user devices 501 and 502 of FIG. 5. The user 699 may control an electronic device using a voice assistant application provided in the smart watch 601, the mobile phone 602, or the AI speaker 603. For example, the user 699 may start the execution of the voice assistant by uttering a wake-up utterance or by generating a user input to a particular device (e.g., button input or touch input). The user can then control the target device by performing a control utterance.

In the example of FIG. 6, a first light 621, a standing lamp 622, and a TV 623 are assumed to be located in the living room 681, and a second light 624, a third light 625, and a refrigerator 626 may be assumed to be located in the kitchen 682. In an example, the user 699 may use the voice assistant of the mobile phone 602 to execute a voice command. For example, the utterance of the user 699 may be as follows: "Turn on the living room light." Since the first light 621 and the standing lamp 622 are located in the living room 681, the voice assistant of the mobile phone 602 may turn on the first light 621 and the standing lamp 622. In this case, since the type (e.g., light) and location (e.g., living room) of the target device are specified by the utterance of the user 699, the voice assistant may identify the target device from the utterance.

In an example, the user 699 may want to control the device that is receiving the utterance via voice control. In this case, the utterance of the user 699 may not include information on the name or location of the device to be controlled. The user 699 directly controls the device that receives the utterance, and the user 699 may determine that separate information for identifying a target device is unnecessary. In this case, it is necessary to identify which device of the smart watch 601, the mobile phone 602, and the AI speaker 603 capable of receiving the utterance of the user 699 is the target of the utterance of the user 699.

According to embodiments of the present disclosure, a device capable of performing a function corresponding to the control utterance may be determined as the target device, among the devices that have received the utterance. In this case, even if the user 699 does not mention the name of the target device to be controlled, the target device matching the intent of the user 699 may be controlled based on the utterance. For example, context information about devices that have received the wake-up utterance may be collected, and the target device capable of performing the function corresponding to the control utterance may be determined based on the context information.

Hereinafter, methods for identifying the target device may be described in detail with reference to FIGS. 7 to 12.

Figure 7:
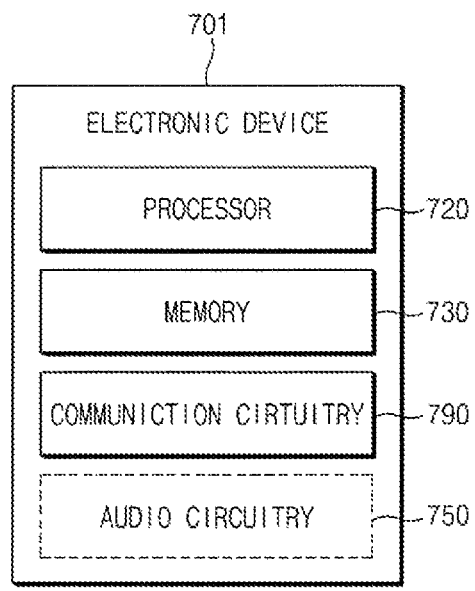
FIG. 7 illustrates a block diagram of an electronic device according to an example.

FIG. 7 illustrates a block diagram of an electronic device according to an example.

Referring to FIG. 7, according to an embodiment, an electronic device 701 may include a processor 720 (e.g., the processor 120 of FIG. 1), a memory 730 (e.g., the memory 130 of FIG. 1), and/or a communication circuitry 790 (e.g., the communication module 190 of FIG. 1). For example, the electronic device 701 may further include audio circuitry 750 (e.g., the audio module 170 of FIG. 1), and may further include other components not shown in FIG. 7. For example, the electronic device 701 may further include at least some components of the electronic device 101 of FIG. 1.

In examples of the present disclosure, the electronic device 701 may be referred to as a device for identifying and/or determining the target device. For example, if identification and/or determination of the target device is performed in a server device (e.g., the server device 511 of FIG. 5), the electronic device 701 may be referred to as the server device. For example, if identification and/or determination of the target device is performed in a user device (e.g., the first user device 501 and/or the second user device 502 of FIG. 5), the electronic device 701 may be referred to as the user device. The fact that, after the target device is identified, control of the target device may be performed using another device is as described above. Accordingly, the electronic device 701 may directly control the target device or may indirectly control the target device through another device.

The processor 720 may be electrically, operatively, or functionally connected to the memory 730, the communication circuitry 790, and/or the audio circuitry 750. The memory 730 may store instructions. When the instructions are executed by the processor 720, the instructions may cause the electronic device 701 to perform various operations.

According to an embodiment, the electronic device 701 may be configured to acquire state information indicating states of a plurality of external electronic devices that have received a wake-up utterance from the plurality of external electronic devices. For example, each of the plurality of external electronic devices may be configured to receive the wake-up utterance using their audio receiving circuitry. For example, the state information may include active service information about each of the plurality of external electronic devices. For example, the active service may be a service currently running in each of the plurality of external electronic devices.

According to an embodiment, the electronic device 701 may be configured to acquire control data corresponding to a control utterance subsequent to the wake-up utterance. For example, the control utterance may indicate control of a first function. For example, the control data may not include identification information (e.g., name) about the target device. The electronic device 701 may be configured to identify an intent corresponding to the control data based on speech recognition of the control data and to identify the first function corresponding to the intent.

According to an embodiment, the electronic device 701 may be configured to determine availability of the first function for at least some of the plurality of external electronic devices by using the state information. For example, the electronic device 701 may be configured to identify functions corresponding to the active service indicated by the active service information, and to determine the availability by comparing the identified functions with the first function.

According to an embodiment, the electronic device 701 may be configured to determine the target device to perform the first function from the plurality of external electronic devices, based on the availability. For example, the electronic device 701 may be configured to identify a first device group supporting the first function among a plurality of external electronic devices. The electronic device 701 may be configured to determine the availability of the first function in the first device group by using the state information, and to determine the target device based on the availability. For example, if it is determined that the first function is available in a first external electronic device and a second external electronic device, the electronic device 701 may be configured to determine, from the first external electronic device and the second external electronic device, the device with high reception volume or reception sensitivity of the wake-up utterance as the target device. For an example, the electronic device 701 may be configured to determine the device with higher frequency of use as the target device from the first external electronic device and the second external electronic device.

According to an embodiment, the electronic device 701 may be configured to control the target device so as to perform the first function. For example, the electronic device 701 may control the target device by directly transmitting information indicating performance of the first function to the target device or indirectly transmitting through another device.

Figure 8:
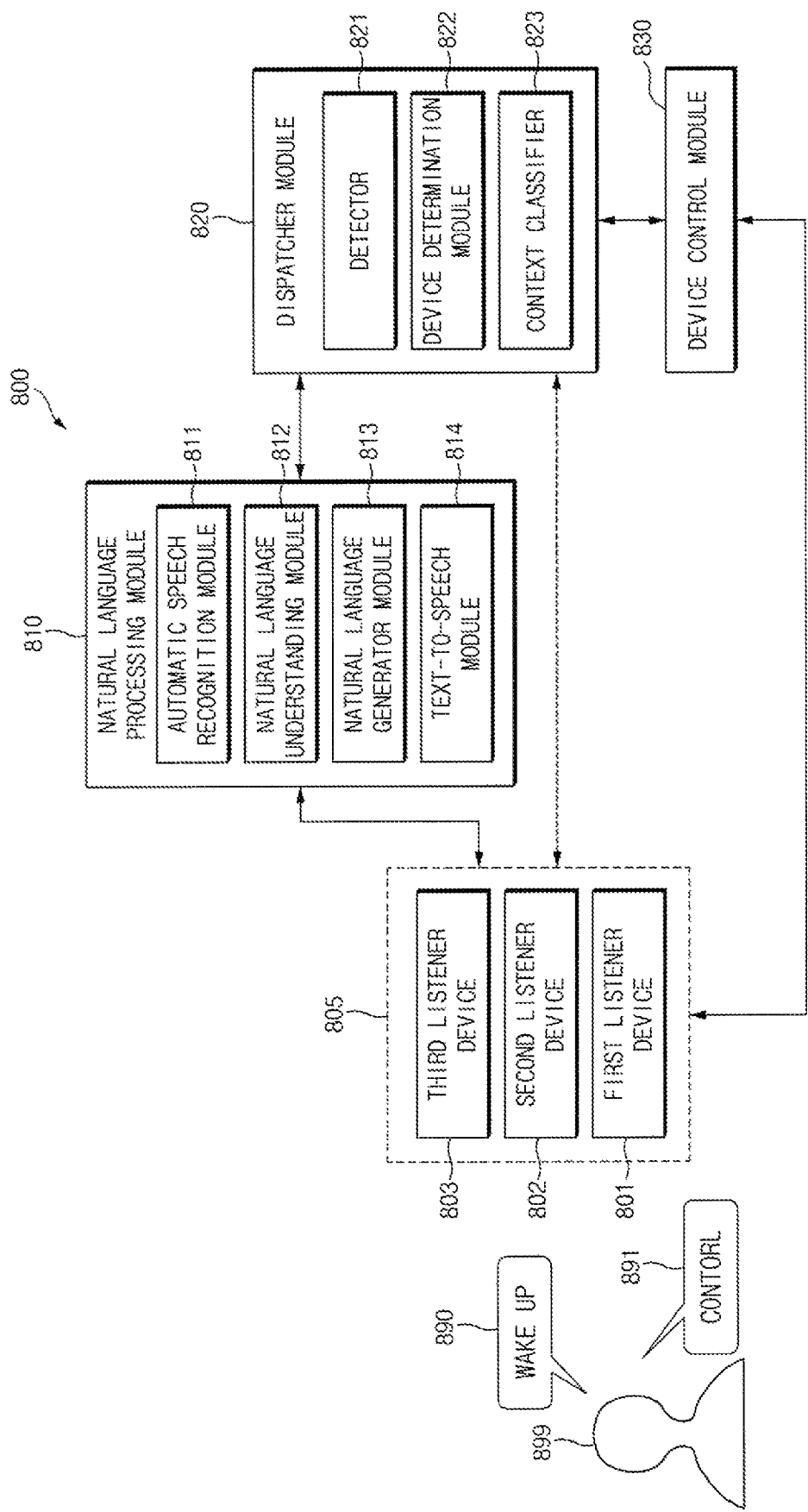
FIG. 8 illustrates a system for controlling a listener device according to an example.

FIG. 8 illustrates a system for controlling a listener device according to an example.

Referring to FIG. 8, the system 800 may include various modules for controlling at least one of a plurality of listener devices 805 based on the utterance of the user 899. The term "module" in FIG. 8 may refer to a software module or a hardware module. If the module is a software module, the module may be implemented by executing instructions by a processor.

In an example, a natural language processing module 810 may be included in the first server 512 of FIG. 5, and a dispatcher module 820 and a device control module 830 may be included in the second server 513 of FIG. 5. In an example, each of the plurality of listener devices 805 may include the natural language processing module 810, and the server device 511 of FIG. 5 may include the dispatcher module 820 and the device control module 830. In an example, each of the plurality of listener devices 805 may include the natural language processing module 810, the dispatcher module 820, and the device control module 830. As described above with reference to FIG. 7, the electronic device 701 of FIG. 7 may be referred to as an electronic device including at least a device determination module 822.

Each of the plurality of listener devices 805 is a device in which a voice assistant application is installed, and may receive the utterance of the user 899 and transmit utterance data corresponding to the utterance to a server device (e.g., the first server 512 in FIG. 5). Hereinafter, for convenience of description, operations of the first listener device 801 are described, but the second listener device 802 and the third listener device 803 may also be configured to perform the same or similar operations.

For example, the first listener device 801 may receive a wake-up utterance 890 from the user 899. The first listener device 801 may activate the voice assistant application and activate a microphone (e.g., the audio circuitry 750 of FIG. 7), in response to receiving the wake-up utterance 890. The first listener device 801 may transmit state information about the first listener device 801 to the dispatcher module 820 in response to receiving the wake-up utterance 890. The state information about the first listener device 801 may include information on the state of at least one function currently being executed in the first listener device 801. For example, the state information may include information on a service currently activated in the first listener device 801. If music is being played in the first listener device 801, the state information about the first listener device 801 may indicate that the music playback service is activated. If there is no service currently activated in the first listener device 801, the state information about the first listener device 801 may indicate that there is no service currently activated. In an example, the state information may further include device type information (e.g., mobile, speaker, TV, or the like) and/or a winner device indicator (described below).

In the example of FIG. 8, the plurality of listener devices 805 may be assumed to have received the wake-up utterance 890. In examples of the present disclosure, "reception of an utterance" may refer to successful reception of the utterance. "Successful reception" may mean, for example, when the speech of the utterance is recognizable, when the signal-to-noise ratio (SNR) of the utterance is greater than or equal to a specified value, or when the volume of the utterance is greater than or equal to a specified value.

As described above, each of the plurality of listener devices 805 may transmit state information to the dispatcher module 820 in response to the wake-up utterance 890. For example, if the dispatcher module 820 is included in the server, each of the plurality of listener devices 805 may transmit state information to the dispatcher module 820 through a network such as the Internet. For another example, if the dispatcher module 820 is included in each of the listener devices, each of the plurality of listener devices 805 may share state information with each other by transmitting (e.g., broadcasting) its own state information through a local area network (e.g., network(s) based on WiFi, Bluetooth, NAAN, and/or UWB).

The winner device may be determined from the plurality of listener devices 805. For example, each of the plurality of listener devices 805 may transmit reception information (e.g., reception volume and/or SNR) for the wake-up utterance 890 to the dispatcher module 820. The dispatcher module 820 may determine the winner device from the plurality of listener devices 805 by using the reception information for the wake-up utterance 890. The dispatcher module 820 may determine the device with the highest reception volume or the device with the highest SNR as the winner device by using the reception information. For example, each of the plurality of listener devices 805 may share reception information for the wake-up utterance 890 with each other. Each of the plurality of listener devices 805 may determine the winner device by using the reception information. For example, each of the plurality of listener devices 805 may determine the device with the highest reception volume or the device with the highest SNR as the winner device. Each of the plurality of listener devices 805 may be configured to transmit state information including information about the winner device (e.g., winner device indicator), if the winner device is determined by the plurality of listener devices 805.

In the example of FIG. 8, the plurality of listener devices 805 may receive a control utterance 891 subsequent to the wake-up utterance 890. The control utterance 891 is an utterance instructing control of a specific function, and in the example of FIG. 8, the control utterance 891 may not include information on the name of the target device to be controlled. The control utterance 981 may be transmitted from the plurality of listener devices 805 to the natural language processing module 810.

The natural language processing module 810 may identify an intent of the user based on utterance data (e.g., data corresponding to the control utterance 981) received from the plurality of listener devices 805. For example, the natural language processing module 810 may correspond to the intelligent server 300 of FIG. 2 (e.g., the first server 512 of FIG. 5). Although not shown in FIG. 8, the natural language processing module 810 may further include a front end (e.g., the front end 310 of FIG. 2).

The natural language processing module 810 may generate text data from utterance data by using automatic speech recognition module 811 (e.g., the automatic speech recognition module 321 of FIG. 2) to perform speech recognition on the utterance data. The natural language processing module 810 may use a natural language understanding module 812 (e.g., the natural language understanding module 323 of FIG. 2) to identify the intent from the text data. For example, the natural language processing module 810 may identify the intent corresponding to the utterance (e.g., the control utterance 891) by comparing a plurality of predefined intents with the text data. Further, the natural language processing module 810 may extract additional information from the utterance data. For example, the natural language processing module 810 may perform slot tagging or slot filling by extracting words (e.g., entities) included in the utterance data.

The natural language processing module 810 may use a natural language generator module 813 (e.g., the natural language generator module 327 of FIG. 2) to provide feedback (e.g., response) on the utterance (e.g., the control utterance 891) to the user. For example, the natural language generator module 813 may generate the feedback to be provided to the user as a natural language expression. A text-to-speech module 814 (e.g., the text-to-speech module 329 of FIG. 2) may convert the natural language expression generated by the natural language generator module 813 from text data to voice data. For example, the natural language processing module 810 may provide a response to the utterance to the user 899 through the first listener device 801 by transmitting the generated voice data to the first listener device 801.

The natural language processing module 810 may transmit the intent identified from the utterance of the user 899 (e.g., the control utterance 891) to the dispatcher module 820. The natural language processing module 810 may transmit the identified intent and the extracted additional information (e.g., entity) from the control utterance 891 to the dispatcher module 820.

According to an embodiment, the dispatcher module 820 may include a detector 821, the device determination module 822, and a context classifier 823. The detector 821 may transmit information on a candidate device capable of performing the function corresponding to the control utterance 891 (e.g., the function corresponding to the intent of the control utterance 891) to the device determination module 822. For example, the detector 821 may transmit, to the device determination module 822, a list of candidate devices capable of executing the function corresponding to the control utterance 891, among devices associated with the user 899 in the plurality of listener devices 805 (e.g., electronic devices registered to the account of the user 899). Table 1 shows an example of candidate device information if the control utterance 891 is "volume up".

TABLE 1

| Utterance | Intent | Candidate Device Information |
| --- | --- | --- |
| Volume Up | Media-Volume-Up | TV in Bedroom |
| | | TV in Living Room |
| | | Speaker 1 in Living Room |
| | | Speaker 2 in Living Room |
| | | Mobile Phone |

The context classifier 823 may use the state information about the plurality of listener devices 805 that have received the wake-up utterance 890 to determine availability of functions of each of the plurality of listener devices 805. For example, if the state information about the third listener device 803 indicates media is being played, the context classifier 823 may identify functions that may be executed during media playback (e.g., adjust volume, stop playback, and so on) as available functions. The context classifier 823 may include a database of functions mapped to each service, and may determine the availability of functions mapped to the service based on the state of the service received from listener devices. The context classifier 823 may transmit the availability of each function identified based on the state information to the device determination module 822.

Table 2 below shows state information according to an example.

TABLE 2

| Device | Device Type | Winner Device | Active Service |
|---|---|---|---|
| First Listener Device | Mobile Phone | TRUE | NONE |
| Second Listener Device | TV in Living Room | FALSE | NONE |
| Third Listener Device | Speaker in Living Room | FALSE | MUSIC PLAYBACK |

The context classifier 823 may identify available functions mapped to active services of the third listener device 803. Table 3 below shows available functions according to an example.

TABLE 3

| Device Type | Active Service | Available Functions |
|---|---|---|
| Speaker in Living Room | MUSIC PLAY | Media-Volume-Up<br>Media-Volume-Down<br>Media-Stop<br>Etc. |

According to an embodiment, the device determination module 822 may determine the target device from the plurality of listener devices 805 based on availability. The device determination module 822 may determine a device in which the function corresponding to the intent is available, as the target device from the candidate devices indicated by the candidate device information. In the examples of Tables 1 to 3, the device determination module 822 may determine the third listener device 803 as the target device, because the "Media-Volume-Up" function is available in the third listener device 803, from the candidate devices of Table 1.

If the target device is determined, the dispatcher module 820 may transmit, to the device control module 830, identification information about the determined target device and the intent identified from the control utterance 891. The device control module 830 may transmit, to the target device, information for performing an operation corresponding to the intent. In the example of FIG. 8, the device control module 830 may increase the playback volume of the third listener device 803 by transmitting, to the third listener device 803, information (e.g., link information specified for the corresponding function) for performing the operation corresponding to "Media-Volume-Up".

In an example, a plurality of electronic devices in the listener devices may be in a state in which the function corresponding to the intent of the control utterance 891 is available. For example, the second listener device 802 and the third listener device 803 may be in states in which "Media-Volume-Up" is available. For example, the device determination module 822 may determine the winner device indicated by the state information as the target device. For example, the device determination module 822 may determine, from the second listener device 802 and the third listener device 803, the device with higher reception volume or the device with higher SNR of the wake-up utterance 890 as the target device. For an example, the device determination module 822 may determine both the second listener device 802 and the third listener device 803 as target devices to cause the second listener device 802 and the third listener device 803 to perform the function corresponding to the control utterance 891. For example, the device determination module 822 may ask the user 899 which one of the second listener device 802 and the third listener device 803 wants to be controlled. In this case, the device determination module 822 may ask the user 899 using the winner device of the plurality of listener devices 805. The device determination module 822 may determine the target device based on the response of the user 899.

In an example, there may be none of the listener devices in which the function corresponding to the intent of the control utterance 891 is available. In this case, the device determination module 822 may determine the target device based on history information. The device determination module 822 may identify a device included in the candidate devices in the plurality of listener devices 805, and determine a listener device with the highest voice-based control frequency as the target device from the identified listener devices. In another example, the device determination module 822 may identify a device included in the candidate devices, and may inquire of the user 899 which one of the identified devices he or she wants to be controlled. The device determination module 822 may determine the target device based on the response of the user 899 to the inquiry.

Figure 9:
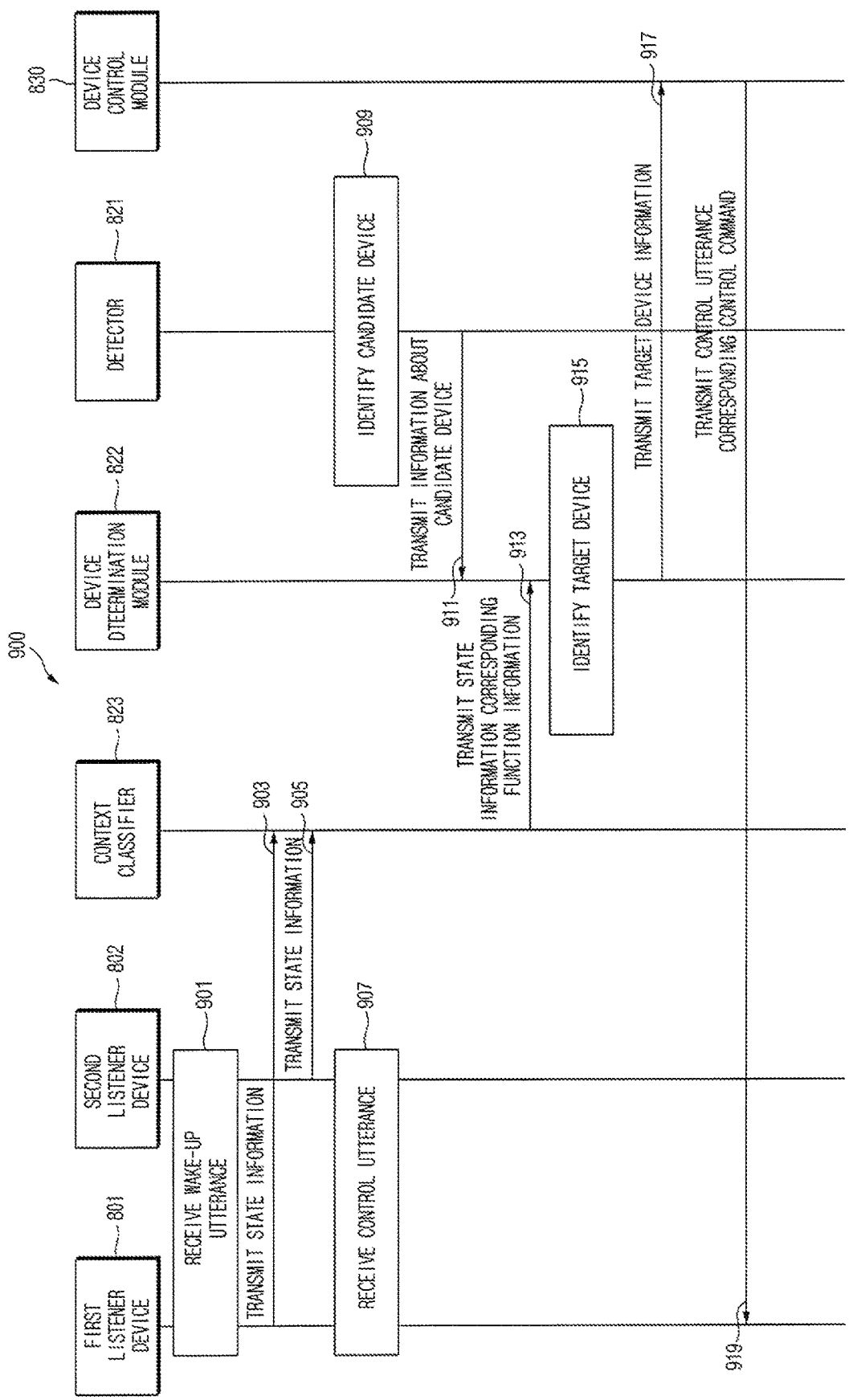
FIG. 9 is a signal flow diagram illustrating a method for controlling a target device according to an example.

FIG. 9 is a signal flow diagram illustrating a method for controlling a target device according to an example.

Referring to FIGS. 7, 8, and 9, the electronic device 701 may be a device separate from the listener device (e.g., the server device 511 of FIG. 5). For example, the detector 821, the device determination module 822, the context classifier 823, and the device control module 830 may be referred to as components of the electronic device 701. According to an embodiment, the electronic device 701 may determine a target device from the listener devices.

In operation 901 of a signal flow diagram 900, the first listener device 801 and the second listener device 802 may receive a wake-up utterance. In operation 903, the first listener device 801 may transmit state information about the first listener device 801 to the context classifier 823 in response to receiving the wake-up utterance. The state information may include information regarding an active service of the first listener device 801, type information, and/or a winner device indicator, as described above. In operation 905, the second listener device 802 may transmit state information about the second listener device 802 to the context classifier 823 in response to receiving the wake-up utterance. The state information may include information regarding an active service of the second listener device 802, type information, and/or a winner device indicator.

In operation 907, the first listener device 801 and the second listener device 802 may receive a control utterance. For example, the control utterance may indicate control of the first function and may not include the name of the target device. The first listener device 801 and the second listener device 802 may transmit data corresponding to the control utterance to a speech recognition module (e.g., the natural language processing module 810 of FIG. 8) in response to receiving the control utterance.

In operation 909, the detector 821 may identify one or more candidate devices. For example, the detector 821 may receive an intent (e.g., control target function) corresponding to the control utterance from a speech recognition module (not shown), and identify candidate devices by using the intent. The detector 821 may identify, as the candidate devices, devices associated with the first listener device 801 and the second listener device 802 (e.g., registered with a user account of the first listener device 801 and the second listener device 802) and supporting the function corresponding to the intent of the control utterance.

In operation 911, the detector 821 may transmit candidate device information to the device determination module 822. In operation 913, the context classifier 823 may transmit state information corresponding function information to the device determination module 822. The context classifier 823 may transmit, to the device determination module 822, the state information corresponding function information, which includes information on available functions corresponding to the state information (e.g., active service information) about the first listener device 801. The context classifier 823 may transmit, to the device determination module 822, the state information corresponding function information, which includes information on available functions corresponding to the state information (e.g., active service information) about the second listener device 802. In the example of FIG. 9, operation 913 has been illustrated as being performed after operation 911. However, examples of the present disclosure are not limited thereto. Operation 913 may be performed at any time after the reception of the control utterance (e.g., operation 907).

In operation 915, the device determination module 822 may identify the target device. For example, the device determination module 822 may identify the listener device in which state information corresponding function information indicates that the function corresponding to the control utterance is available, as the target device selected from the candidate devices indicated by the candidate device information. For example, the device determination module 822 may identify the device in which the function corresponding to the control utterance is available, as the target device selected from devices listed in the candidate device information and also are listener devices. For example, in the example of FIG. 9, the device determination module 822 may identify the first listener device 801 as the target device.

In operation 917, the device determination module 822 may transmit target device information to the device control module 830. For example, the device determination module 822 may transmit identification information about the first listener device 801 to the device control module 830.

In operation 919, the device control module 830 may transmit a control utterance corresponding control command (a command corresponding to the intent of the control utterance) to the first listener device 801. The device control module 830 may receive the target device information from the device determination module 822, and may receive the control command from the speech recognition module (not shown). In another example, the device control module 830 may receive the target device information and the control command from the device determination module 822.

Figure 10:
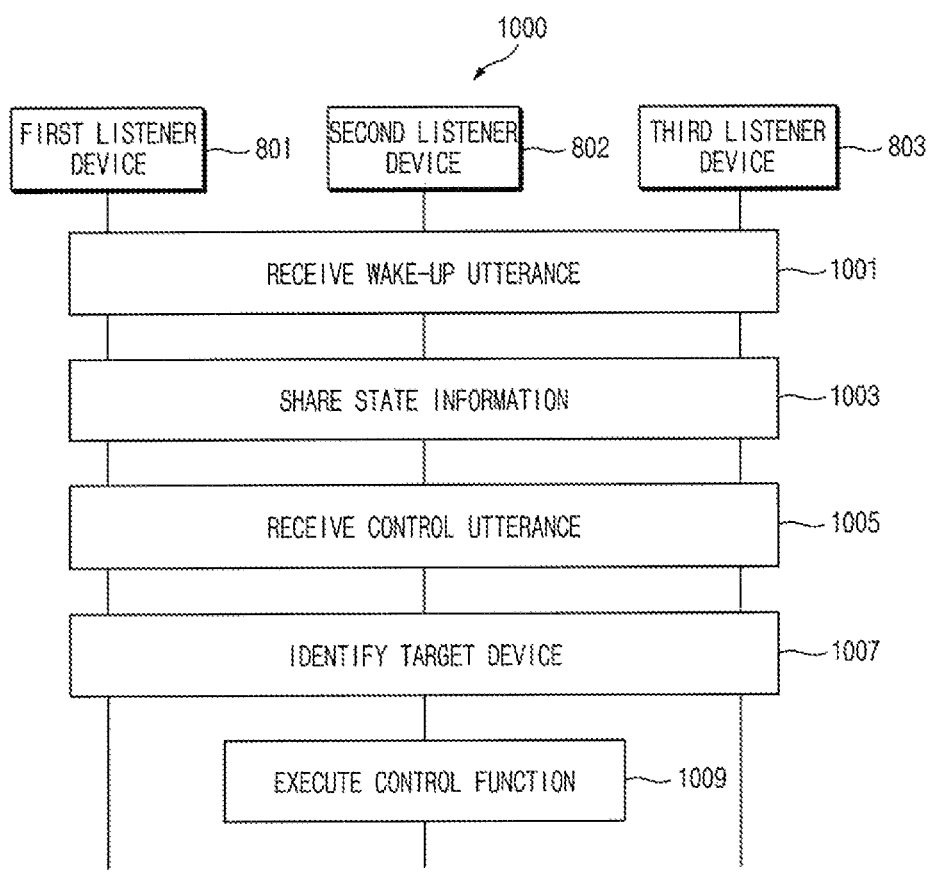
FIG. 10 is a signal flow diagram illustrating a method for controlling a target device according to an example.

FIG. 10 is a signal flow diagram illustrating a method for controlling a target device according to an example.

Referring to FIGS. 7, 8, and 10, the electronic device 701 may be a listener device. For example, the detector 821, the device determination module 822, the context classifier 823, and the device control module 830 may be referred to as components of the electronic device 701. According to an embodiment, the electronic device 701 may determine a target device from the listener devices.

In operation 1001 of a signal flow diagram 1000, the first listener device 801, the second listener device 802, and the third listener device 803 may receive a wake-up utterance. In operation 1003, the first listener device 801, the second listener device 802, and the third listener device 803 may share state information in response to receiving the wake-up utterance. For example, each of the first listener device 801, the second listener device 802, and the third listener device 803 may share state information by transmitting (e.g., broadcasting) its own state information through the local area network. The state information may include information regarding active service, type information, and/or wake-up utterance reception information (e.g., reception strength and/or SNR) for each listener device.

In operation 1005, the first listener device 801, the second listener device 802, and the third listener device 803 may receive a control utterance. For example, the control utterance may indicate control of the first function and may not include the name of the target device.

In operation 1007, each of the first listener device 801, the second listener device 802, and the third listener device 803 may identify the target device. For example, each listener device may determine based on its current active service whether it can perform the function corresponding to the control utterance. Each listener device may share its current availability of the function corresponding to the control utterance among the listener devices by transmitting (e.g., broadcasting) information indicating the availability. Each listener device may identify the target device based on the availability. If a single listener device is identified as the only target device (e.g., if information received from another listener device indicates that the function corresponding to the control utterance is not available), the listener device may execute the control function as the target device. For example, if the second listener device 802 is identified as the target device, in operation 1009, the second listener device 802 may execute the control function.

Figure 11:
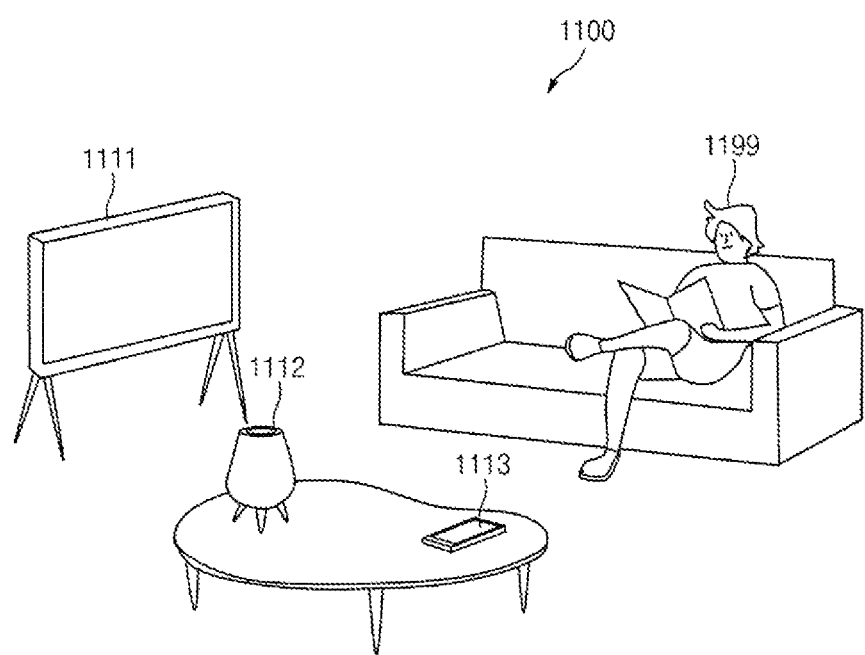
FIG. 11 illustrates a control environment of a target device according to an example.

FIG. 11 illustrates a control environment of a target device according to an example.

Referring to FIG. 11, in a control environment 1100, a user 1199 may want to control another device via voice command. The user 1199 may call the voice assistant through a wake-up utterance (e.g., utterance of a wake-up word). In the example of FIG. 11, it may be assumed that, among a first electronic device 1111, a second electronic device 1112, and a third electronic device 1113, the second electronic device 1112 and the third electronic device 1113 have received the utterance. In the examples of the present disclosure, the first electronic device 1111 that has failed to receive the wake-up utterance may be excluded as a candidate for being a target device of a subsequent control utterance. By determining only the devices that have directly received the wake-up utterance as potential target devices, the electronic devices may better execute the intent of the user.

The user 1199 may speak the control utterance following the wake-up utterance. For example, the user 1199 may say "Volume up". In the example of FIG. 11, the second electronic device 1112 may be playing music, and the third electronic device 1113 may be on standby. In this case, the second electronic device 1112 may be in the state in which media volume control is available, and the third electronic device 1113 may be in the state in which media volume control is not available. According to embodiments of the present disclosure, from devices that have received the wake-up utterance, the device in which the function corresponding to the control utterance is available may be determined as the target device. For example, the second electronic device 1112 may be determined as the target device. In this case, the second electronic device 1112 may perform the operation corresponding to the control utterance of the user. The second electronic device 1112 may provide feedback to the user 1199 after performing the operation corresponding to the control utterance.

Figure 12:
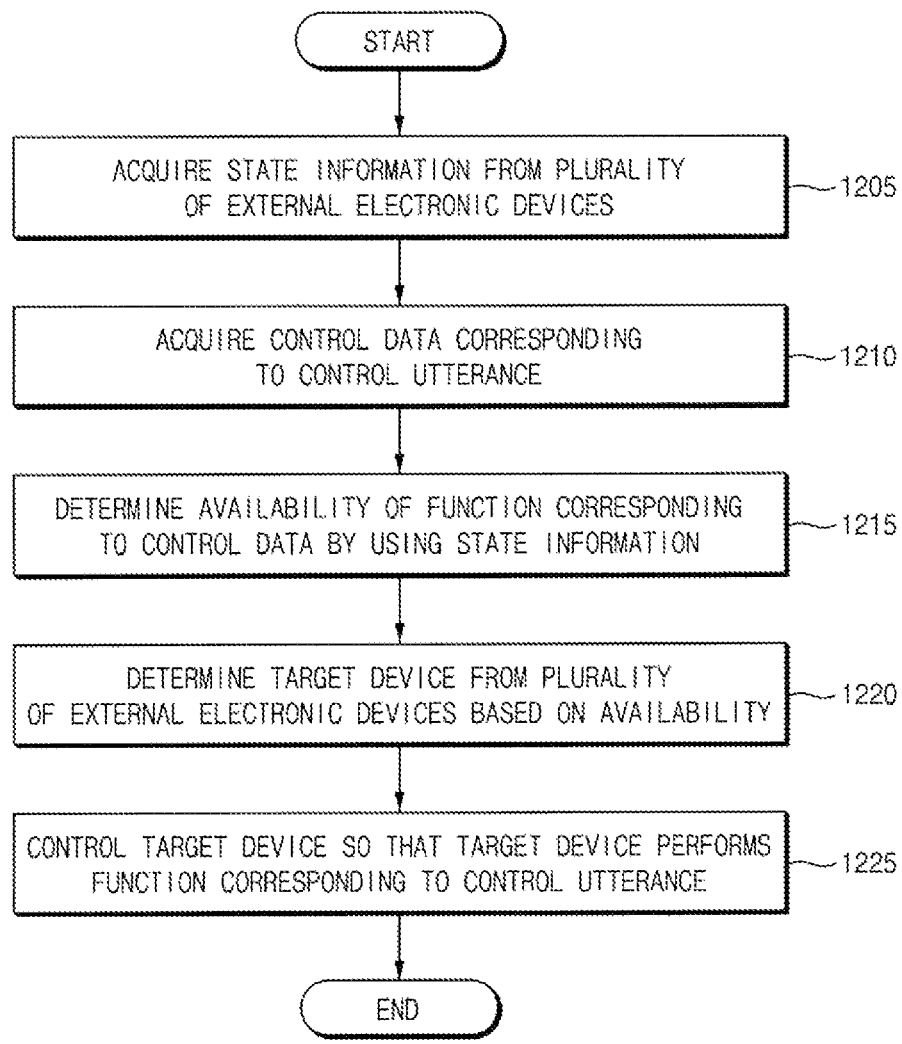
FIG. 12 is a flowchart illustrating a method for controlling a target device according to an example.

FIG. 12 is a flowchart illustrating a method for controlling a target device according to an example.

Referring to FIGS. 7 and 12, according to an embodiment, the electronic device 701 may determine a target device based on availability of a function corresponding to a control utterance.

In operation 1205, the electronic device 701 may acquire state information from a plurality of external electronic devices. Each of the plurality of external electronic devices may be configured to transmit the state information in response to reception of a wake-up utterance. For example, each of the plurality of external electronic devices may be configured to receive the wake-up utterance using audio receiving circuitry. The state information may include active service information, device type information, and/or winner device information for each of the plurality of external electronic devices. It may be assumed that each of the plurality of external electronic devices has successfully received the wake-up utterance.

In operation 1210, the electronic device 701 may acquire control data corresponding to the control utterance. For example, the electronic device 701 may acquire control data corresponding to the control utterance by receiving the control data from a plurality of external electronic devices. The control data may be data acquired through voice recognition for the control utterance. The control data may not include identification information (e.g., name) about the target device. As an example, the electronic device 701 may be configured to identify an intent corresponding to the control data based on speech recognition of the control data and to identify a first function corresponding to the intent.

In operation 1215, the electronic device 701 may determine availability of the function (hereinafter, referred to as the control function) corresponding to the control data by using the state information. The electronic device 701 may identify state information about each of the plurality of external electronic devices and a function mapped to a service indicated by the state information. The electronic device 701 may identify the function mapped to the service (e.g., active service) indicated by the state information as an available function. For example, if functions mapped to services activated in the first external electronic device include the control function, the electronic device 701 may determine that the control function is available in the first external electronic device. For example, the active service may correspond to a service currently running in each of the plurality of external electronic devices.

In operation 1220, the electronic device 701 may determine the target device from a plurality of external electronic devices based on the availability. For example, the electronic device 701 may determine an external electronic device capable of performing the control function as the target device. In another example, if the control function is available in a plurality of external electronic devices, the electronic device 701 may determine the target device according to one of the methods described above with reference to FIG. 8.

For example, the determining of the target device (operation 1220) may include identifying a first device group supporting the first function among external electronic devices associated with accounts of the plurality of external electronic devices, identifying a second device group consisting of devices belonging to the first device group among the plurality of external electronic devices, determining availability of the first function of external electronic devices in the second device group by using the state information, and determining the target device based on the availability.

For example, the determining of the target device (operation 1220) may include determining that the first function is available in a first external electronic device and a second external electronic device in the plurality of external electronic devices, based on the state information, and determining, in the first external electronic device and the second external electronic device, the device with a high reception volume or reception sensitivity of the wake-up utterance as the target device.

For example, the determining of the target device (operation 1220) may include determining that the first function is available in a first external electronic device and a second external electronic device in the plurality of external electronic devices, based on the state information, and determining, in the first external electronic device and the second external electronic device, the device with a high frequency of use as the target device.

In operation 1225, the electronic device 701 may control the target device so that the target device performs the function corresponding to the control utterance. For example, the electronic device 701 may control the determined target device by transmitting, to the target device, information instructing control of the function corresponding to the control data.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a microphone;
communication circuitry;
a processor; and
a memory that stores instructions,
wherein the instructions, when executed by the processor, cause the electronic device to:
obtain a wake-up utterance using the microphone;
broadcast, based on obtaining the wake-up utterance, state information of the electronic device indicating at least one service being currently executed by the electronic device;

obtain, from a plurality of external electronic devices that have received the wake-up utterance, state information indicating currently executed services of the plurality of external electronic devices;

obtain control data corresponding to a control utterance subsequent to the wake-up utterance, the control utterance instructing control of a first function;

identify a first group of devices, among the electronic device and the plurality of external electronic devices, registered to an account of the electronic device;

determine availability of the first function for the first group of devices by identifying available functions supported by currently executed services, the currently executed services being indicated by the state information of the electronic device and the plurality of external electronic devices;

determine a target device to perform the first function among the first group of devices, based on the availability; and control the target device to perform the first function.

2. The electronic device of claim 1, wherein the instructions, when executed by the processor, cause the electronic device to:

determine the availability by comparing the available functions with the first function.

3. The electronic device of claim 1, wherein the instructions, when executed by the processor, cause the electronic device to:

identify an intent corresponding to the control data based on speech recognition of the control data; and identify the first function as corresponding to the intent.

4. The electronic device of claim 1, wherein a name of the target device is absent in the control data.

5. The electronic device of claim 1, wherein the instructions, when executed by the processor, cause the electronic device to:

determine that the first function is available in a first external electronic device and a second external electronic device among the first group of devices, based on the state information; and determine, from the first external electronic device and the second external electronic device, a device with a high reception volume or reception sensitivity of the wake-up utterance as the target device.

6. The electronic device of claim 1, wherein the instructions, when executed by the processor, cause the electronic device to:

determine that the first function is available in a first external electronic device and a second external electronic device among the first group of devices, based on the state information; and determine, from the first external electronic device and the second external electronic device, a device with a high frequency of use as the target device.

7. The electronic device of claim 1, wherein each of the plurality of external electronic devices is configured to receive the wake-up utterance using audio receiving circuitry.

8. A method for controlling a target device of an electronic device, the method comprising:

obtaining a wake-up:

broadcasting, based on obtaining the wake-up utterance, state information of the electronic device indicating at least one service being currently executed by the electronic device;

obtaining, from a plurality of external electronic devices that have received a wake-up utterance, state information indicating states of the plurality of external electronic devices;

obtaining control data corresponding to a control utterance subsequent to the wake-up utterance, the control utterance instructing control of a first function;

identifying a first group of devices, among the electronic device and the plurality of external electronic devices, registered to an account of the electronic device determining availability of the first function for the first group of devices by identifying available functions supported by currently executed services, the currently executed services being indicated by the state information of the electronic device and the plurality of external electronic devices;

determining a target device to perform the first function among the first group of devices, based on the availability; and controlling the target device to perform the first function.

9. The method of claim 8, wherein the determining availability includes:

determining the availability by comparing the available functions with the first function.

10. The method of claim 8, further comprising:

identifying an intent corresponding to the control data based on speech recognition of the control data; and identifying the first function as corresponding to the intent.

11. The method of claim 8, wherein a name of the target device is absent in the control data.

12. The method of claim 8, wherein the determining of the target device includes:

determining that the first function is available in a first external electronic device and a second external electronic device among the first group of devices, based on the state information; and determining, from the first external electronic device and the second external electronic device, a device with a high reception volume or reception sensitivity of the wake-up utterance as the target device.

13. The method of claim 8, wherein the determining of the target device includes:

determining that the first function is available in a first external electronic device and a second external electronic device among the first group of devices, based on the state information; and determining, from the first external electronic device and the second external electronic device, a device with a high frequency of use as the target device.

14. The method of claim 8, wherein each of the plurality of external electronic devices is configured to receive the wake-up utterance using audio receiving circuitry.

* * * * *